United States Patent [19]

Werbin

[11] Patent Number: 5,671,162
[45] Date of Patent: Sep. 23, 1997

[54] DEVICE FOR RECORDING DESCENT DATA FOR SKYDIVING

[76] Inventor: Roy Geoffrey Werbin, 32F Village Green, Budd Lake, N.J. 07828

[21] Appl. No.: 546,684

[22] Filed: Oct. 23, 1995

[51] Int. Cl.⁶ .................................................... G01B 7/00
[52] U.S. Cl. ................... 364/561; 364/413.31; 364/558; 364/557; 73/4 R; 73/865.2; 73/178 R
[58] Field of Search .......................... 364/413.31, 561, 364/558, 571.01, 569, 433, 557; 368/10, 11, 14, 89; 244/149, 150, 145, 147, 151 B, 152; 73/384–387, 4 R, 865.1–865.3, 179, 178 R; 340/977, 973, 970; 968/885, DIG. 1

[56] References Cited

U.S. PATENT DOCUMENTS

| | | | |
|---|---|---|---|
| 4,835,716 | 5/1989 | Tamahi et al. | 364/558 |
| 4,969,358 | 11/1990 | Peet, II | 73/384 |
| 5,058,427 | 10/1991 | Brandt | 73/384 |
| 5,224,059 | 6/1993 | Nitta et al. | 364/558 |
| 5,295,085 | 3/1994 | Hoffacker | 73/384 |
| 5,423,215 | 6/1995 | Frankel | 73/386 |

OTHER PUBLICATIONS

Hitech design of West Germany, Altitude Information System Flyer, no date, pp. 1,2.

*Primary Examiner*—James P. Trammell
*Assistant Examiner*—Hal D. Wachsman
*Attorney, Agent, or Firm*—Thomas L. Adams

[57] ABSTRACT

This device can record descent data for successive skydiving jumps with a pressure transducer for providing a pressure signal signifying ambient pressure. The device also has a processor coupled to the pressure transducer for displaying descent data on a display. The processor has a triggering routine and a recording routine. The triggering routine can provide a trigger signal in response to predetermined changes in the pressure signal from the pressure transducer. The recording routine can record for each jump in response to the trigger signal, a datum corresponding to the pressure signal. Each datum is held for at least a predetermined number of succeeding jumps. A temperature sensor coupled to the processor can provide a temperature signal signifying ambient temperature. The processor can display through the display, altitude signals derived from the pressure signal and adjusted by the temperature signal. The process of recording includes detecting predetermined changes in the pressure signal from the pressure transducer to provide a trigger signal. The procedure also includes recording for each jump in response to the trigger signal a datum corresponding to the pressure signal and holding each datum for at least a predetermined number of succeeding jumps.

46 Claims, 4 Drawing Sheets

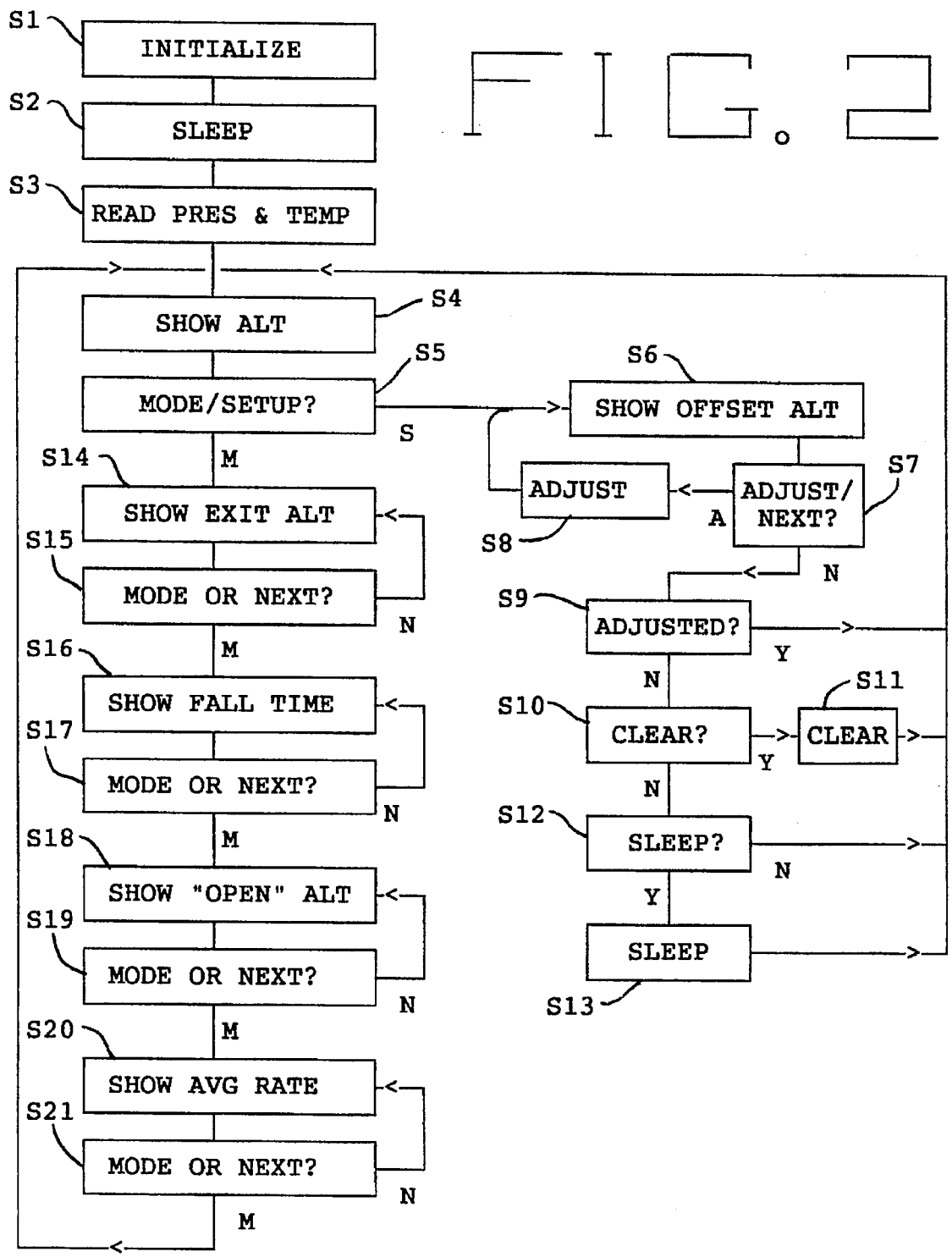

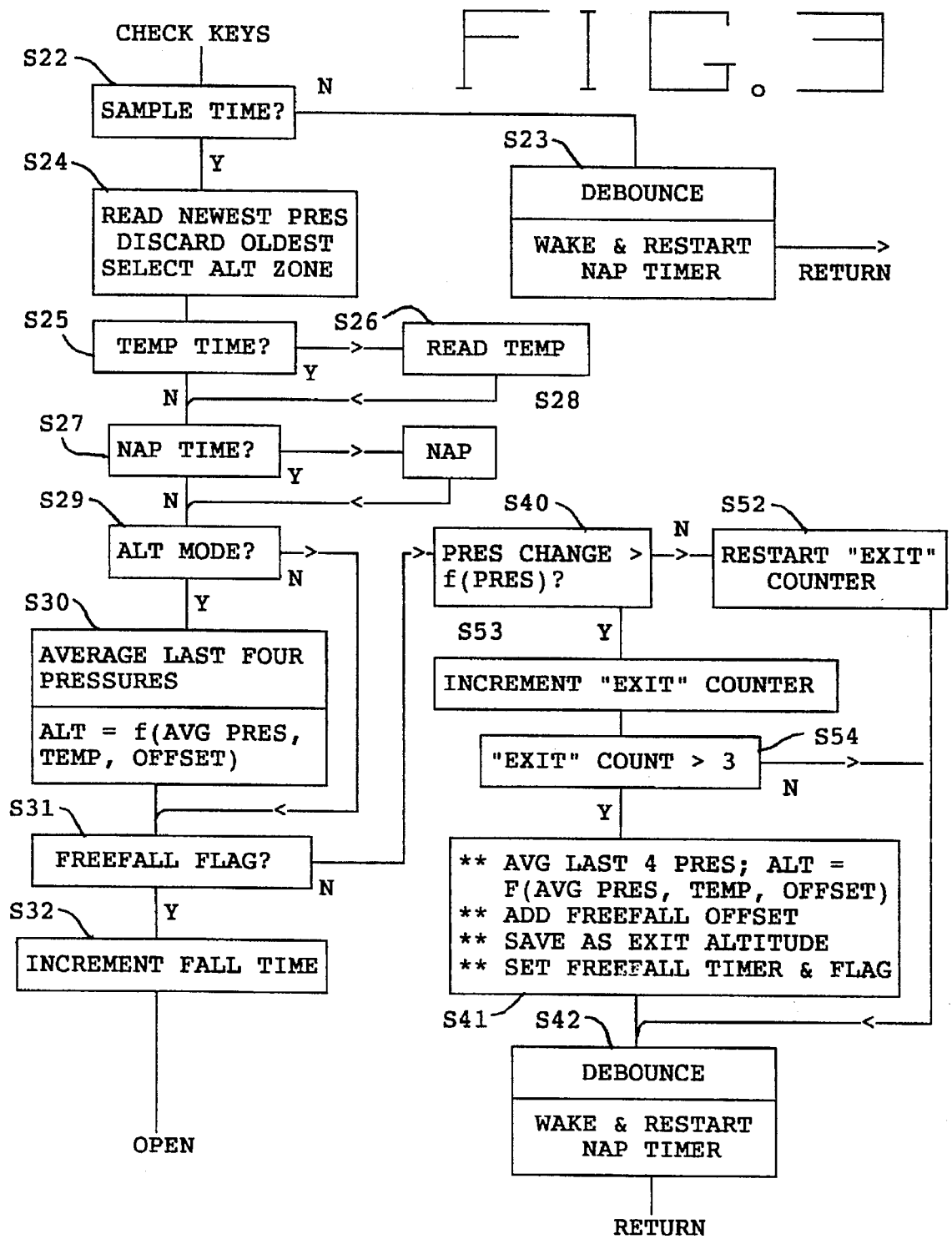

DEVICE FOR RECORDING DESCENT DATA FOR SKYDIVING

BACKGROUND OF THE INVENTION

1. Field of the Invention

The present invention relates to devices and methods for measuring descent data for skydivers, and in particular, to devices for recording such data.

2. Description of Related Art

Skydivers are interested in measuring and keeping a record of certain aspects of successive jumps. A skydiver will often wish to know the altitude at which the diver left the airplane as well as the altitude the parachute opened. Also of significant interest is the average rate of fall and the time elapsed during freefall.

Various instruments have been developed for showing skydivers their altitude. Such devices have often been coupled with alarms to indicate that a skydiver is at an unacceptably low altitude. Barometric devices mounted in a wristwatch and useful for this purpose are shown in U.S. Pat. Nos. 4,257,112; 4,279,028; and 5,224,059.

Numerous barometric systems have been disclosed for determining barometric altitude and rate of change of altitude for aircraft. For example, in U.S. Pat. No. 4,936,142 a pneumatic system is disclosed where changes in pressure are sensed pneumatically by connecting one chamber to another through a narrow conduit. The resulting pressure differential can be sensed to indicate vertical speed. Such measurements are inappropriate for skydivers where the gusts and buffeting associated with freefalling will make such measurements relatively inaccurate. Other systems can either use a barometric altimeter or a radio altimeter to warn a pilot of an excessive loss of altitude during takeoff. See for example, U.S. Pat. No. 5,283,574.

A solid state altimeter shown in U.S. Pat. No. 4,694,694 can be worn on a wrist. This altimeter can display the rate of climb or descent both as instantaneous or average values over selected intervals. The instrument can also determine peak rate by storing the highest rate measured during an interval. This instrument can also provide an accumulated value for vertical changes in one direction, ignoring intervening changes in direction.

U.S. Pat. No. 4,779,461 uses a rather specialized differential pressure sensor to determine the small pressure changes occurring when a container is dropped. This system automatically records the height of the drop.

U.S. Pat. No. 5,148,376 shows an instrument for displaying depth and pressure and is especially adapted to scuba diving. This instrument records data concerning a dive.

U.S. Pat. No. 5,001,929 shows an altimeter that is locked unless motion is sensed by, for example, a sensor on a bicycle wheel.

U.S. Pat. No. 4,539,843 shows an altimeter for ultra-light aircraft that can also display vertical speed. This device does not store readings for historical purposes.

U.S. Pat. No. 5,058,427 has an altimeter useful for showing bicyclist and hikers their altitude changes. This device does not record descent rates and specific altitudes such as when exiting an airplane or opening a parachute.

U.S. Pat. No. 4,292,671 uses a microprocessor to determine altitude as on a non-linear function of air pressure. This system also calculates vertical rate, but does not record data such as significant altitudes, or rates of descent. See also U.S. Pat. Nos. 4,106,343; and 4,253,335.

U.S. Pat. No. 4,858,856 uses a microprocessor to determine altitude and rate of descent for the purpose automatically deploying a parachute if the skydiver has a high descent rate at unsafe low altitudes. This device does not display or record any altitudes, rates of descent or descent times. Such automatic chute opening release systems, are provided as the Cypres System manufactured by Airtec of Germany. Related instruments are the low altitude warning devices such as the Dytter and Paralert both sold by Para Gear Equipment Company, Skokie, Ill.

See also U.S. Pat. Nos. 4,835,716 and 4,879,669.

HiTech Design of West Germany advertised an altitude information system, stating that the system "relieves the involved counting work of your freefall time. At any time your freefalltime as well as the maximum and average freefall speed of your last 5 jumps can be retrieved." The manner of operation of this system is unclear.

Also, a wrist worn digital altimeter (Digimaster altimeter) manufactured SSE, Inc. was advertised with a display that can be adjusted for the pressure at ground level. This wrist altimeter has a pair of buttons that are simultaneously pressed to establish a set-up mode. This altimeter also has the ability to "power down" if altitude does not change in three minutes. Other wrist or hand worn digital altimeters include the Digitude freefall altimeter, manufactured by Altitude Concepts of Winston, Ga.

SUMMARY OF THE INVENTION

In accordance with the illustrative embodiments demonstrating features and advantages of the present invention there is provided a device for recording descent data for successive skydiving jumps. The device includes a pressure transducer, a display means and a processing means. The pressure transducer can provide a pressure signal signifying ambient pressure. The display means can display descent data. The processing means is coupled to the display means and the pressure transducer. The processing means includes a trigger means and a recording means. The trigger means can provide a trigger signal in response to predetermined changes in the pressure signal from the pressure transducer. The recording means can record for each jump in response to the trigger signal, a datum corresponding to the pressure signal. Each datum is held for at least a predetermined number of succeeding jumps.

Also in accordance with another aspect of the invention there is provided a device with the same pressure transducer and display means. The device also includes a processing means coupled to the display means and the pressure transducer. The processing means has a trigger means for providing a trigger signal in response to predetermined changes in the pressure signal from the pressure transducer. The device also has a temperature sensor coupled to the processing means for providing a temperature signal signifying ambient temperature. The processing means is operable to display through the display means altitude signals derived from the pressure signal and adjusted by the temperature signal.

According to another aspect of the invention a method is provided for recording descent data for successive skydiving jumps, with an ambient pressure transducer. The method includes the step of detecting predetermined changes in the pressure signal from the pressure transducer to provide a trigger signal. Another step is recording for each jump in response to the trigger signal a datum corresponding to the pressure signal. The method also includes the step of holding each datum for at least a predetermined number of succeeding jumps.

By employing apparatus and methods of the foregoing type an improved technique is achieved for recording descent data for a skydiver. In a preferred embodiment, the device can sense the altitude the skydiver exited from an airplane by monitoring the rate of change of a pressure transducer. If the pressure increases above a threshold over a predetermined period of time, the system notes that the skydiver may have exited the aircraft. This rate of change is verified three more times (four total) before the exiting is officially declared by the device.

In a similar fashion, the opening of the parachute is detected by pressure changes during predetermined intervals being less than a predetermined magnitude. The thresholds for both the exit and parachute opening altitude are selected depending in dependence on the altitude of the measurement.

The pressure data is stored as altitude by converting the pressure signal based on a piecewise linear function that is corrected for temperature and is also offset to give a zero altitude reading at ground. Also, any altitude stored or displayed is based on the average of the last four pressure readings to provide a more reliable signal. Also, the device can store the average rate of fall based on the difference between the exit and opening altitude and the time elapsed between those events.

By recording data in the foregoing fashion the preferred device can be used as a database so a skydiver can review data from a predetermined number of prior jumps. For example, the skydiver can review for each recorded jump the altitude for exiting the aircraft, the altitude for the opening of the parachute, the average descent rate, the descent time, or other data. The preferred system will, upon recording data for the most recent jump, erase data for the earliest jump (if necessary to avoid storing more than the predetermined number of jumps).

An automatic "nap" feature is provided so that if an operator does not depress a key for a predetermined period of time, the display is disabled to reduce power, although the microprocessor continues to work normally to allow detection of changes in descent rate. Also in the preferred embodiment, the operator can select a "sleep" mode, where a microprocessor is placed in a quiescent state (triggers not detected) to consume a minimum amount of power, while the display is turned off as well (although previously recorded jump data is retained).

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention, when taken in conjunction with the accompanying drawings, wherein:

FIGS. 2, 3 and 4 are flowcharts illustrating the programming associated with the device of FIG. 1 and implementing a method in accordance with the principles of the present invention.

DETAILED DESCRIPTION OF THE PREFERRED EMBODIMENTS

Figures 1, 5:
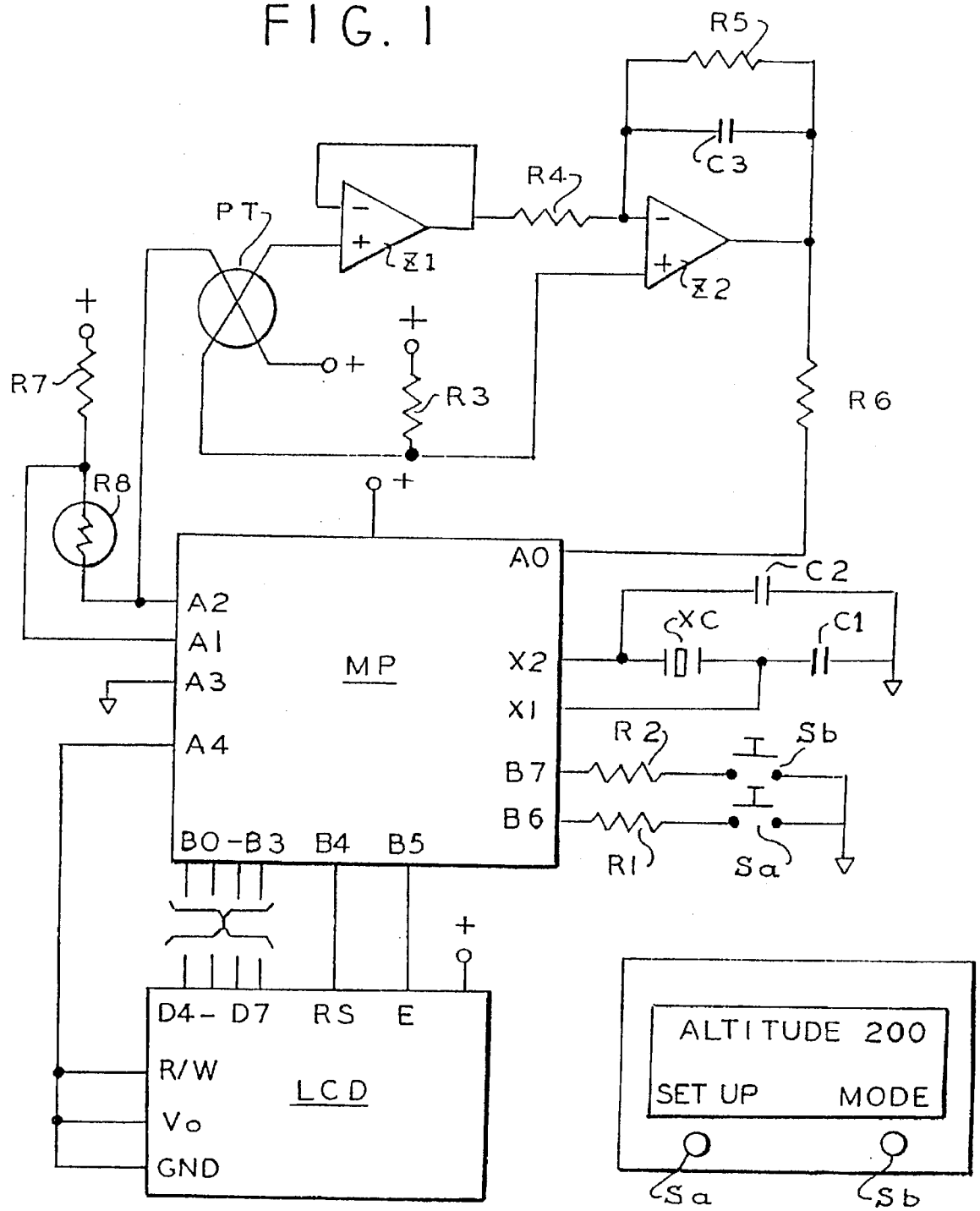
FIG. 1 is a schematic diagram of a device in accordance with the principles of the present invention.
FIG. 5 is a front view of the display and case for the device of FIG. 1.

Referring to FIG. 1, the device includes a processing means, shown herein as microprocessor MP. Microprocessor MP may be a microcontroller manufactured by Microchip Technologies as part number PIC16C71, although other types of microprocessors or microcontrollers can be used instead. Microprocessor MP is also referred to as including a combined trigger and recording means.

Microcontroller MP is shown connected to a display means LCD, herein a liquid crystal display module manufactured by Batron (part number BT21603) although other types of displays can be used as well. In particular, data lines B0–B3 of microcontroller MP connect to data inputs D4–D7 of display LCD. Also, data lines B4 and B5 of microcontroller MP connect to register select RS and enable line E of display LCD. Also, read/write line R/W, control line $V_o$ and ground line GND all connect together to output line A4 of micro controller MP. Data lines B6 and B7 of microcontroller MP connect through resistors R1 and R2 to keys, namely, grounding switches Sa and Sb.

A timing crystal XC is shown connected between terminals X1 and X2 of microcontroller MP. Terminals X1 and X2 are also shunted to ground through capacitors C1 and C2, respectively.

A pressure transducer PT is shown with its power line connected to positive supply voltage and its normally grounded terminal connected to line A2 of microcontroller MP. When terminal A2 of microprocessor MP is grounded, the pressure transducer PT is energized and can produce an output voltage across its two other terminals, which has a predetermined relationship to the ambient pressure at the pressure transducer PT. The pressure transducer of a constructed embodiment had a piezoelectric crystal, which operates in a bridge configuration to produce a voltage as a function of ambient pressure. Such a pressure transducer may be an absolute pressure sensor, such as Motorola type MPX2100A, although various other types of pressure transducers may be used instead.

The non-inverting terminal of operational amplifier Z1 is connected to one of the output voltage lines of pressure transducer PT. The other output line of pressure transducer PT is connected to the non-inverting input of operational amplifier Z2 and to pull-up resistor R3. Operational amplifiers Z1 and Z2 were in one constructed embodiment contained in a dual operational amplifier manufactured by Maxim as part no. MAX407CSA, although other operational amplifiers or discrete amplifiers of various types can be used instead.

The output of amplifier Z1 is connected to its inverting terminal to create a unity amplifier. Since the output of amplifier Z1 connects through resistor R4 to the inverting input of amplifier Z2, the voltage across the inputs of amplifier Z2 are effectively the voltage across the output lines of pressure transducer PT. Amplifier Z2 has negative feedback from its output to inverting input in the form of a parallel combination of resistor R5 and filtering capacitor C3. Resistors R5 and R4 can be selected to provide an appropriate gain, while resistor R3 can be selected to provide an appropriate offset for the output of amplifier Z2. The pressure signal at the output of amplifier Z2 connects through resistor R6 to the input A0 of microcontroller MP.

A temperature sensor is shown herein as the serial combination of resistor R7 and thermistor R8, serially connected between positive potential and the line A2 of microcontroller MP. The junction between resistors R7 and R8 is connected to line A1 of microcontroller MP to provide a temperature signal.

To facilitate an understanding of the principles associated with the foregoing apparatus, its operation will be briefly described in connection with the flowcharts of FIGS. 2–4 and the display panel shown in FIG. 5. The flowcharts of FIGS. 2–4 signify the workings of a program that is recorded in non-volatile memory in microcontroller MP.

When power is first applied to the system, the program performs an initializing step S1 (FIG. 2) where certain flags and registers are set. In a succeeding step S2, a sleep mode is entered with terminal A4 of microcontroller MP (FIG. 1) going high to disable display LCD. Also, terminal A2 goes high to remove power from pressure transducer PT and thermistor R8. Also in the sleep mode, the microcontroller MP enters a quiescent state where the program stops cycling and relatively little power is consumed. Essentially the microcontroller MP is just awaiting the next depression of one of the keys on the device.

After a key depression the system awaits simultaneous depression of keys Sa and Sb for a present period of time, e.g. three seconds. In response, the system then leaves the sleep mode and terminal A4 goes low to power display LCD. In succeeding step S3, microcontroller MP reads the pressure and temperature. Indeed, as described hereinafter, the subroutine of FIG. 3 is executed periodically, wherein pressure and temperature is potentially measured. During this initialization phase, however, the timers and flags are set so that the pressure and temperature will definitely be recorded at this time. The manner in which pressure and temperature is obtained will be further described in connection with FIG. 3.

Next in step S4, microcontroller MP sends data along lines B0–B5 (FIG. 1) to provide the display shown in FIG. 5. The altitude displayed on the screen of FIG. 5 is referred to as an altitude signal. This display indicates an altitude of 200 feet, which may be a typical offset due to variations in local air pressure. Normally, a skydiver will wish to set the altitude reading at ground level to zero. To adjust for such an offset the operator can depress key Sa to transfer control from step S5 to step S6 for the purpose of initiating an offset adjustment.

In the preferred embodiment, inadvertent entry into the set-up mode is avoided by requiring the operator to press the set-up button Sa (FIG. 5) followed by a rapid depression in sequence of mode button Sb, set-up button Sa again and finally mode button Sb. This button sequence will transfer the program from step S5 to step S6 (FIG. 2). In this state, the bottom line of the display of FIG. 5 shows the legend "UP ←NEXT→ DN." This legend signifies that the left key Sa can be used to adjust the reading up while the right key Sb adjusts downwardly. Such commands from keys Sa and Sb are issued in step S7, and executed in step S8 where the actual adjustments are performed, before a display of the adjusted reading in step S6. This adjustment procedure can proceed by cycling through steps S6–S8 until the operator is satisfied with the display.

If the operator now simultaneously depresses keys Sa and Sb this signifies the desire to move to the next menu. In step S9 the system determines whether the operator had just adjusted the altitude display by exercising step S8. If so, the system returns to step S4, otherwise step S10 is executed and display LCD (FIG. 1) provides a menu where the top line has the legend "CLEAR JUMPS? " and the bottom line has the legend "YES NO." This menu prompts the user to indicate whether the data already recorded in memory concerning prior jumps ought to be cleared.

If the operator depresses affirmative key Sa (FIG. 5) to indicate a desire to clear the memory, step S10 transfers control to step S11. In step S11 the memory locations in microcontroller MP containing the record of prior jumps is cleared before control returns to step S4. Otherwise, the operator can depress negative key Sb and step S12 is executed.

In step S12 the microcontroller MP (FIG. 1) causes display LCD to show the legend "POWER DOWN?" on the top line and "YES NO" on the bottom line. If the user responds negatively by depressing key Sb, control returns to step S4 (FIG. 2). If key Sa is depressed instead, step S13 calls the sleep mode, which performs in the same manner as was previously described in connection step S2. When the sleep mode of step S13 is interrupted by another key depression, control returns to step S4, when keys Sa and Sb are simultaneously depressed for three seconds, as previously discussed in connection with step S2.

Whenever control is returned to step S4, the altitude screen is displayed as shown in FIG. 5 and the system returns to step S5 awaiting further key strokes commanding either a mode change or entry into the set up sequence. If the operator depresses key Sb to indicate a desire to change mode, step S14 is executed. In step S14 display LCD shows a stored value of "exit" altitude previously obtained in a manner that will be described presently. The display may, for example, show the legend "EXIT AT 7200" on the top line and "JUMP#4 MODE" on the bottom line. This display indicates that the exit altitude stored for the fourth jump is 7200 feet.

If the operator next presses key Sa, in step S15 the data stored for the next jump, the fifth jump, will be displayed. Successive depressions of key Sa will cause the display to cycle through jumps 1 through 5.

If the operator should next depress key Sb to indicate a desire to change mode, step S16 is executed. In step S16, the microcontroller can display, for example, "FREEFALL 27 SEC" on the top line and "JUMP#5 MODE" on the bottom line. This indicates that for the fifth jump the skydiver was freefalling for 27 seconds. As before the operator can successively press key Sa and cycle with steps S16 and S17 through the freefall times stored for up to five jumps.

Alternatively, the operator may depress key Sb, indicating a desire to change modes again. In response, step S18 is executed and the microcontroller may display: "OPEN AT 2100" on the top line and "JUMP#5 MODE" on the bottom line, for example. This display indicates the device recorded for the fifth jump a parachute opening at an altitude of 2100 feet. As before, the operator can cycle through the various jumps by depressing key Sa or can change modes by depressing key Sb to transfer control to step S20.

In step S20 the display may show "AVG RATE 78MPH" on the top line and "JUMP#5 MODE" on the bottom line, for example. This display indicates for the fifth jump the average descent rate was 78 miles per hour. Again, the operator can cycle the rate data for the five stored jumps or can depress the mode switch Sb which returns control to step S4.

It will be appreciated that a relationship exists among exit altitude, open altitude, fall time, and average rate. Effectively, one need store all but one of these values. For example, the fall time can be derived by dividing the difference between the exit and open altitude by the average descent rate (as explained below the descent rate is corrected in a special way). Other derived values are apparent.

In the operations described in connection with FIG. 2, keys were depressed at various times to sequence the display or to initiate set up sequences. Accordingly, the system appeared to the operator to be awaiting a key depression. Actually, the system does not simply wait at this time but performs various operations and calculations during this ostensible waiting period. During this interval the system will cycle through some or all of the steps of FIG. 3, periodically executing, when appropriate, the steps of FIG. 4.

Thus for each of the steps in FIG. 2 where a key input is expected, the system actually transfers control to step S22 of FIG. 3. In step S22 an internal software timer is read to determine if the scheduled time has arrived to sample one or more of the system transducers. If not step S23 is executed where a key depression is handled.

In step S23 any key depression will be read and processed to ignore switch bounce. Also the occurrence of a key depression will terminate any ensuing nap mode. How a nap mode is started will be described below. If in the nap mode, microcontroller MP disables display LCD (FIG. 1) by applying a high voltage from line A4, thereby interrupting power consumed by the display. A key depression sensed in step S23 restores this power to the display. Also a key depression restarts a software timer used to trigger a nap mode after detecting an excessively long interval without key strokes.

After step S23 is completed the software returns to the calling step in FIG. 2 where the system was awaiting a key stroke. If key was not just depressed, the calling step will almost immediately recall step S22. This cycle will continue, although the calling step may be completed after a key stroke, in which case the earlier calling step may be succeeded by a new calling step.

Eventually the rapid cycling between the calling step of FIG. 2 and called steps S22 and S23 of FIG. 3 will be diverted when the software timer of step S22 signals that a transducer ought to be read. In response, step S24 is executed.

In step S24 microcontroller MP (FIG. 1) reads pressure transducer PT by first applying a ground signal to line A2. This causes transducer PT to produce a voltage between the non-inverting terminals of amplifiers Z1 and Z2, corresponding to the ambient pressure and therefore altitude. Since amplifier Z1 is a follower, the output of amplifier Z2 is proportional to the output of transducer PT. An analog pressure signal is therefore applied to line A0 of microcontroller MP. This input is processed by an analog to digital converter inside microcontroller MP to produce a digital signal representing the magnitude of the voltage at line A0.

Memory locations inside microcontroller MP are now shifted (alternatively pointers are changed) so that the newest pressure reading is stored and the oldest pressure reading discarded. Also at this time, the latest pressure reading is evaluated to determine whether it constitutes a "high" or "low" pressure reading. As described hereinafter, the system operation compares the rate of change to a variable threshold. The threshold is adjusted depending upon whether the latest pressure readings signify a "high" or "low" altitude or pressure. Essentially, the rate of change of pressure has different significance depending upon altitude. An appropriate flag is set to indicate the high/low zone.

Next, the software timer of step S25 determines whether the scheduled time has arrived to record the temperature. Temperature is measured less frequently than pressure. For example, pressure may be measured once every second, while temperature is measured once every 15 seconds; although different timings and time ratios can be used instead. If temperature need not be measured now the program executes step S27, otherwise step S26.

In step S26 thermistor R8 then applies a temperature dependent voltage to line A1 of microcontroller MP. The analog voltage on line A1 is applied to an internal analog to digital converter to again produce a digital signal, now representing the temperature measurement. This temperature signal is treated as a sample used to produce an average. For example, the system can record four specific samples, replace the oldest with the newest and then perform an arithmetic average. Alternatively only the average temperature is recorded, which is periodically increased by the amount of the latest temperature reading before being divided by two to produce an updated average temperature. In still another embodiment, an approximate average can be obtained by decreasing a previously stored average value by 25% and then increasing it by 25% of the last measured temperature value.

Next, in step S27, the ground has been removed from line A2 and a software timer determines whether sufficient time has elapsed between key strokes to institute a "nap" mode. If for example a key has not been depressed in 60 seconds, a nap mode is instituted in step S28. In response, microcontroller MP (FIG. 1) applies a high signal on line A4 to disable the display LCD and reduce power consumption. The microcontroller MP however continues to operate normally, although without any display.

Next in step S29, certain software flags are examined to determine if the calling program was in a mode requiring display of altitude. For example, a call from step S5 (FIG. 2) will require the called subroutine to return the current altitude. If an altitude update is not required the program executes step S31, otherwise step S30 is performed.

In step S30, microcontroller MP averages the last four pressure readings stored in memory. This average value is then applied to a piecewise linear function. Specifically, the device is programed to use one of eight linear segments to provide a fairly accurate conversion of pressure to altitude. The linear segment chosen will depend upon the magnitude of the average pressure signal. Next, the average temperature signal stored by the device will be used to compensate the pressure signal. This compensation is based on experimental data indicating the overall sensitivity of the system to temperature. In a constructed embodiment, the altitude reading was linearly compensated by the temperature signal. (In other embodiments more complicated non-linear temperature compensation can be employed instead.) Finally, the altitude offset stored during the set-up program to create a null at ground level is used to adjust the final altitude calculation.

Once all these calculations are performed, the current altitude reading is stored in working memory. It is to be understood that the foregoing determination of displayed altitude is performed in other sections of the program and reference to the foregoing sequence will be made hereinafter.

Next in step S31, the system determines whether a flag has been previously set to indicate the skydiver has begun to freefall. If so step S32 is executed, otherwise the latest pressure sample is compared to the oldest in step S40. In one constructed embodiment this is a comparison between the current pressure and the pressure three seconds earlier. This pressure change is compared to a threshold that is established in dependence upon the previous high/low setting (see discussion in connection with step S24 of FIG. 3). If the pressure increases less than this threshold, an "exit" counter is reset in step S52 and step S42 then executes the same functions that were previously described in connection with step S23 before returning to the calling step of FIG. 2.

If however, the pressure change indicates a sufficient increase, corresponding to the beginning of freefall, the "exit" counter is incremented in step S53. Thereafter if the accumulated count is three or less, step S54 transfers control to step S42. The program will then return to the calling step of FIG. 2, only to cycle back to step S40. If the pressure increase is still above the threshold the "exit" counter will again be incremented before execution of step S42 and then return. If the pressure increase remains high, eventually the cycling will increase the "exit" counter above three, so that comparison step S54 will branch out to step S41. The exit threshold determined by step S40 is referred to as generating a trigger signal for a threshold criteria. Time elapsing due to the incrementing of the "exit" counter is referred to as a lag interval.

In step S41, the altitude is calculated in the same manner as was described previously for step S30 of FIG. 3, that is, the last four pressure readings are averaged and converted to altitude by a piecewise linear function before being corrected for temperature and the offset necessary to account for pressure at ground level. Unlike step S30, the calculated altitude is incremented by an amount needed to account for the distance fallen before reaching a speed high enough to indicate an exit event has occurred (also incremented to account for the lag interval caused by the incrementing of the "exit" counter in step S53. This interval is typically around 500 feet (152 meters). Thereafter, the corrected altitude is stored in memory as an "exit" altitude. Since only five jumps are recorded, the oldest jump data is replaced with the new exit altitude, which is indicated as the latest jump, all the other jump data having been shifted.

Next a flag is set to indicate that freefall has begun. Also, a software timer is reset to allow accumulation of the freefall time. Thereafter previously mentioned step S42 is executed before the system returns to the calling program, to continue the cycling already described.

During a later cycle when a sampling measurement is required, step S22 will transfer control to step S24 of FIG. 3, eventually leading to step S31. Since the freefall flag has been set, the freefall time is incremented in step S32.

Figure 4:
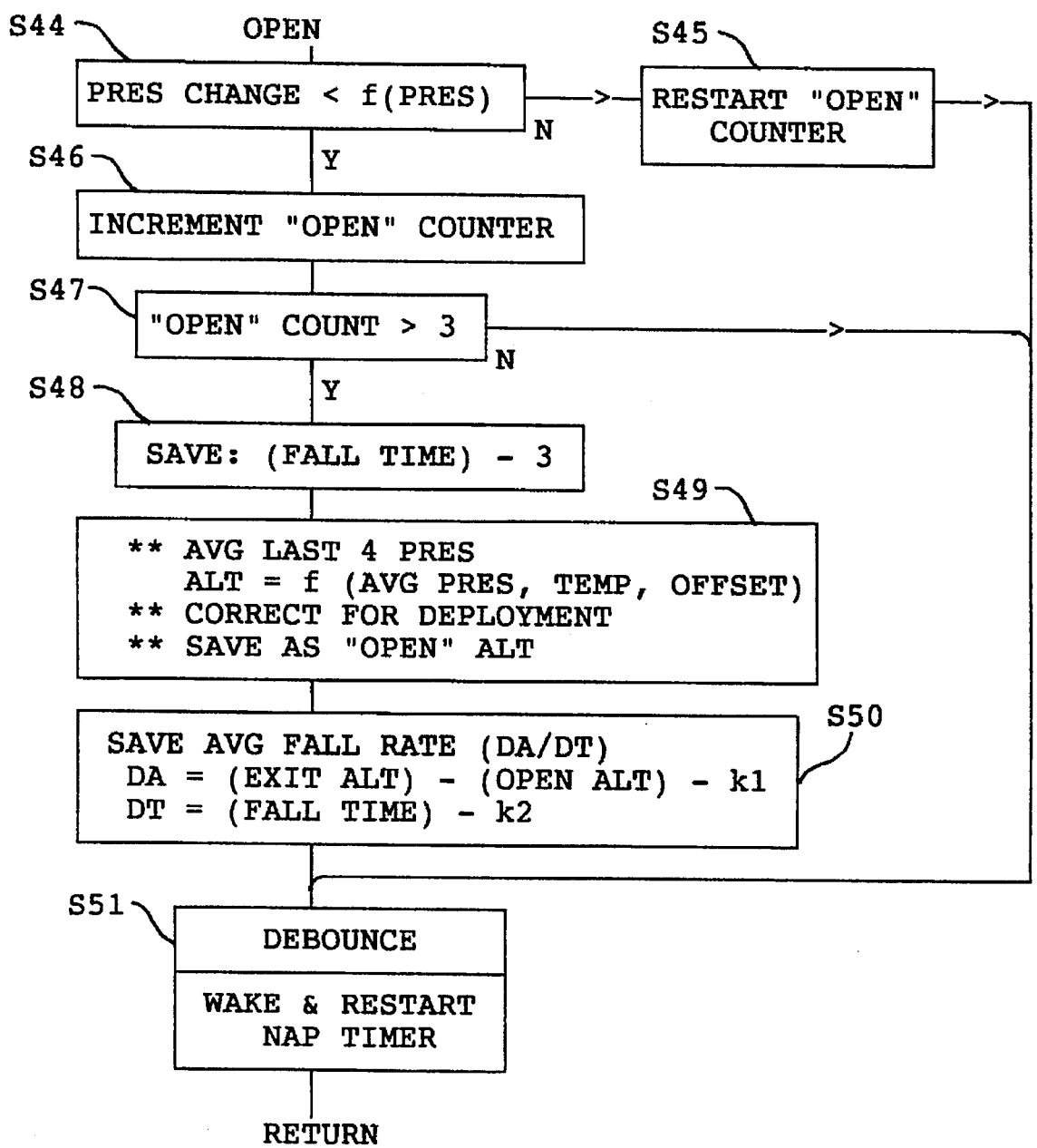

Thereafter, the open routine of FIG. 4 is begun and step S44 is executed. In step S44, the difference between the earliest and latest pressure signal is compared against a threshold. As noted earlier, this threshold is determined by whether the altitude is considered "high" or "low" altitude. The threshold detection of step S44 is also referred to as generating a trigger signal dependent on a criteria, namely, the open threshold.

If the pressure has been changing rapidly, indicating a freefall condition, step S45 is executed. In step S45 an "open" counter is restarted, for a purpose to be described presently. Next, step S51 is executed to perform functions identical to those of step S23 (FIG. 3). Thereafter, control returns to the calling program of FIG. 2, only to cycle back to step S44.

Eventually the pressure will stop changing rapidly when the parachute of the skydiver opens. At that time a relatively low change in pressure will be detected in step S44, thereby transferring control to step S46. A sudden reduction in the rate of change in pressure may simply indicate turbulence or a change in the orientation of the skydiver. Therefore, the system is designed to avoid immediately declaring an "open" condition. Instead, a "open" counter in the microcontroller MP will be incremented and compared to a preset number of counts in step S47. In this embodiment the number of "open" counts required is four. Thus at this time the "open" count is too low and control will be returned through step S51 to the calling program of FIG. 2. The counting for a preset number of times provided by step S47 is referred to as a delay interval.

The system will continue cycling, eventually reaching step S47 a second, a third time and fourth time, after which control is transferred to step S48. In step S48 the fall time is recorded but is first decremented by three seconds to account for the delays incurred by the counting process associated with step S47.

Next in step S49, altitude is calculated in the manner previously described, that is, using a piecewise linear function of the average pressure, and adjusted by temperature and the ground offset value. The altitude calculated at this time is also increased to account for the distance fallen during the time while the parachute is opening as well as the time elapsing during the delay interval associated with step S47; typically a value of three to four hundred feet (91 to 122 meters). This corrected altitude value is then stored as the previously mentioned "open" altitude.

Next in step S50, the average fall rate is calculated as the ratio of the corrected altitude change DA divided by the corrected descent time DT (Alternatively, rate can be calculated later at the time of display.). The corrected altitude change DA is the difference between the exit altitude and the open altitude, but decreased by a typical distance a skydiver will fall at sub-terminal velocity. The previously recorded descent time will likewise be decreased by a typical time needed to reach terminal velocity. Still for a short freefall, the skydiver may never reach terminal velocity, so that subtracting for time elapsed at a preterminal velocity may produce a negative result. Therefore, whenever terminal velocity is not reached on a jump this correction is eliminated and the actual average velocity is stored. The ratio determined by either method can be stored either in feet per second or more typically converted to miles per hour, a value more interesting to skydivers.

It is to be appreciated that various modifications may be implemented with respect to the above described preferred embodiments. For example, various types of processors can be employed and in some instances separate memories, analog to digital converters, and microprocessors can be employed. Also various types of displays can be used depending upon the desired amount of information, power consumption, etc. Also while a pair of operational amplifiers are illustrated, in other embodiments various discrete components or different amplifier configurations can be used instead. In addition, the various calculations deriving various quantities can be performed in a different order and manner. Also, the number of segments used in the piecewise linear equation can be changed depending upon the desired accuracy, speed of conversion, memory, etc. Moreover, the number of jumps stored can be altered depending upon the desired volume of historical data, available memory, etc. Also, the cycling time and the number of samples per minute can be altered depending upon the desired accuracy and the desired speed of the system. Furthermore, the various program steps illustrated above can be performed in a different order and manner; and in some cases certain steps can be eliminated.

Obviously, many modifications and variations of the present invention are possible in light of the above teachings. It is therefore to be understood that within the scope of the appended claims, the invention may be practiced otherwise than as specifically described.

I claim:

1. A device for recording descent data for successive skydiving jumps, comprising:

a pressure transducer for providing a pressure signal signifying ambient pressure;

a display means for displaying descent data; and a processing means coupled to said display means and said pressure transducer, including:

trigger means for sensing a rate of change in the pressure signal from said pressure transducer and for providing a trigger signal in response to the rate of change of the pressure signal crossing a predetermined threshold; and recording means for recording for each jump in response to the trigger signal an altitude datum corresponding to the pressure signal, each altitude datum being held for at least a predetermined number of succeeding jumps for subsequent display on said display means.

2. A device according to claim 1 wherein said trigger means is operable to provide said trigger signal in response to changes in said pressure signal satisfying one of a pair of rate thresholds for said pressure signal, said trigger means being operable to record for each jump a pair of data.

3. A device according to claim 2 wherein said pair of data are held for at least the predetermined number of succeeding jumps.

4. A device according to claim 2 wherein the pair of altitude data signify the pressure signal recorded in response to the pressure signal: (a) reaching a rate of change exceeding an exit threshold, and (b) declining to a rate of change below an open threshold.

5. A device according to claim 4 wherein one or more of the exit and the open thresholds are adjusted by said processing means in accordance with current magnitude of the pressure signal.

6. A device according to claim 4 wherein that one of the pair of altitude data, recorded in response to the pressure signal reaching a rate of change exceeding the exit threshold, is adjusted by said processing means before display by said display means by an amount corresponding to an interval of time occurring prior to reaching a velocity approaching terminal velocity.

7. A device according to claim 4 wherein that one of the pair of altitude data, recorded in response to the pressure signal declining to a rate of change below the open threshold, is adjusted by said processing means before display by said display means by an amount corresponding to an interval of time elapsing during parachute deployment.

8. A device according to claim 4 wherein that one of the pair of altitude data, recorded in response to the pressure signal declining to a rate of change below the open threshold, is recorded after said rate of change of the pressure signal remains below the open threshold for a delay interval.

9. A device according to claim 8 wherein that one of the pair of altitude data, recorded in response to the pressure signal increasing to a rate of change greater than the exit threshold, is recorded after said rate of change of the pressure signal remains greater than the exit threshold for a lag interval.

10. A device according to claim 9 wherein said processing means establishes said delay interval and said lag interval by sampling the pressure signal a preset number of times to confirm the rate of change of the pressure signal against the open threshold and the exit threshold, respectively.

11. A device according to claim 4 wherein said processing means is operable to record for each jump, as an average freefall speed, the ratio of the difference in magnitude and the time elapsing between the pair of altitude data signifying the pressure signal.

12. A device according to claim 11 wherein said processing means is operable to adjust said average freefall speed before display by said display means by correcting both the difference in magnitude and the time elapsing between the pair of altitude data signifying the pressure signal for an interval occurring prior to reaching terminal velocity.

13. A device according to claim 2 wherein said processing means is operable to display through said display means an altitude signal having a piecewise linear relationship to the pressure signal.

14. A device according to claim 1 comprising at least one manually operable key, said processing means being operable in response to said one manually operable key to erase the altitude datum recorded in said recording means.

15. A device according to claim 1 comprising:

at least one manually operable key, said processing means being operable between depressions of said one manually operable key to sample the pressure signal.

16. A device according to claim 15 wherein said processing means is operable in response to depression of said one manually operable key to enter a quiescent state.

17. A device according to claim 15 wherein said processing means is operable to disable said display means in response to an absence of depressions of said one manually operable key.

18. A device according to claim 17 wherein said processing means is operable to restore operation of said display means in response to depression of said one manually operable key.

19. A device according to claim 1 comprising:

a temperature sensor coupled to said processing means for providing a temperature signal signifying ambient temperature, said processing means being operable to display through said display means altitude signals derived from said pressure signal and adjusted by said temperature signal.

20. A device according to claim 19 comprising:

at least one manually operable key, said processing means being operable between depressions of said one manually operable key to sample the temperature signal.

21. A device according to claim 20 wherein said processing means is operable between depressions of said one manually operable key to sample the pressure signal.

22. A device according to claim 19 comprising:

at least one manually operable key, said processing means being operable to display through said display means an altitude signal derived from said pressure signal and numerically corrected by an amount determined by manipulation of said one manually operable key.

23. A device according to claim 22 wherein said processing means is operable to display through said display means an altitude signal having a piecewise linear relationship to the pressure signal.

24. A device according to claim 1 comprising:

at least a pair of manually operable keys, said processing means being operable to respond differently to separate and simultaneous depression of said pair of manually operable keys.

25. A device according to claim 24 wherein said processing means is operable to respond differently to alternating depressions of said pair of manually operable keys depending upon the repetition rate for depression.

26. A device according to claim 1 comprising:

a temperature sensor coupled to said processing means for providing a temperature signal signifying ambient temperature, said processing means being operable to display through said display means altitude signals derived from said pressure signal and adjusted by said temperature signal, said altitude signal being a function of a linear combination of a plurality of samples of said pressure signal.

27. A device according to claim 1 comprising:

a temperature sensor coupled to said processing means for providing a temperature signal signifying ambient temperature, said processing means being operable to display through said display means altitude signals derived from said pressure signal and adjusted by said temperature signal, said altitude signal being a function of a linear combination of a plurality of samples of said temperature signal.

28. A device according to claim 27 wherein said altitude signal is a function of a linear combination of a plurality of samples of said pressure signal sampled more rapidly than samples of said temperature signal.

29. A method for recording descent data for successive skydiving jumps, with an ambient pressure transducer, comprising the steps of:

detecting rates of change in the pressure signal from said pressure transducer to provide a trigger signal in response to the rate of change of the pressure signal crossing a predetermined threshold;

recording for each jump in response to the trigger signal an altitude datum corresponding to the pressure signal;

holding each altitude datum for at least a predetermined number of succeeding jumps; and subsequently displaying the altitude datum from at least one of said jumps.

30. A method according to claim 29 wherein the step of detecting changes in the pressure signal is performed by:

providing said trigger signal in response to changes in said pressure signal satisfying one of a pair of rate thresholds for said pressure signal, the step of recording an altitude datum being performed by recording for each jump a pair of altitude data.

31. A method according to claim 30 wherein the pair of altitude data are held for at least the predetermined number of succeeding jumps.

32. A method according to claim 30 wherein the pair of data signify the pressure signal recorded in response to the pressure signal: (a) reaching a rate of change exceeding an exit threshold, and (b) declining to a rate of change below an open threshold.

33. A method according to claim 32 comprising the step of:

adjusting one or more of the exit and the open thresholds in accordance with current magnitude of the pressure signal.

34. A method according to claim 32 wherein that one of the pair of altitude data, recorded in response to the pressure signal reaching a rate of change exceeding the exit threshold, is adjusted before display by an amount corresponding to an interval of time occurring prior to reaching a velocity approaching terminal velocity.

35. A method according to claim 32 wherein that one of the pair of altitude data, recorded in response to the pressure signal declining to a rate of change below the open threshold, is adjusted before display by an amount corresponding to an interval of time elapsing during parachute deployment.

36. A method according to claim 32 wherein that one of the pair of altitude data, recorded in response to the pressure signal declining to a rate of change below the open threshold, is recorded after said rate of change of the pressure signal remains below the open threshold for a delay interval.

37. A method according to claim 36 wherein that one of the pair of altitude data, recorded in response to the pressure signal reaching a rate of change exceeding the exit threshold, is recorded after said rate of change of the pressure signal remains above the exit threshold for a lag interval.

38. A method according to claim 37 comprising the step of:

establishing said delay interval and said lag interval by sampling the pressure signal a preset number of times to confirm the rate of change of the pressure signal against the open threshold and exit threshold, respectively.

39. A method according to claim 32 comprising the step of:

recording for each jump, as an average freefall speed, the ratio of the difference in magnitude and the time elapsing between the pair of data signifying the pressure signal.

40. A method according to claim 39 comprising the step of:

adjusting said average freefall speed before display by correcting both the difference in magnitude and the time elapsing between the pair of altitude data signifying the pressure signal for an interval of time occurring prior to reaching terminal velocity.

41. A method according to claim 30 comprising the step of:

displaying an altitude signal having a piecewise linear relationship to the pressure signal.

42. A method according to claim 29 comprising:

displaying altitude signals derived from said pressure signal and adjusted by ambient temperature.

43. A method according to claim 29 comprising the step of:

displaying an altitude signal having a piecewise linear relationship to the pressure signal.

44. A method according to claim 29 comprising the step of:

displaying altitude signals derived from said pressure signal and adjusted by ambient temperature, said altitude signal being a function of a linear combination of a plurality of samples of said pressure signal.

45. A method according to claim 29 comprising:

displaying an altitude signal derived from said pressure signal and adjusted by ambient temperature, said altitude signal being a function of a linear combination of a plurality of samples of said ambient temperature.

46. A method according to claim 45 wherein said altitude signal is a function of a linear combination of a plurality of samples of said pressure signal sampled more rapidly than samples of said ambient temperature.

* * * * *